June 15, 1937. F. H. BREHOB 2,084,187
COOLING SYSTEM FOR INTERNAL COMBUSTION ENGINE ARRANGEMENTS
Filed Aug. 23, 1935
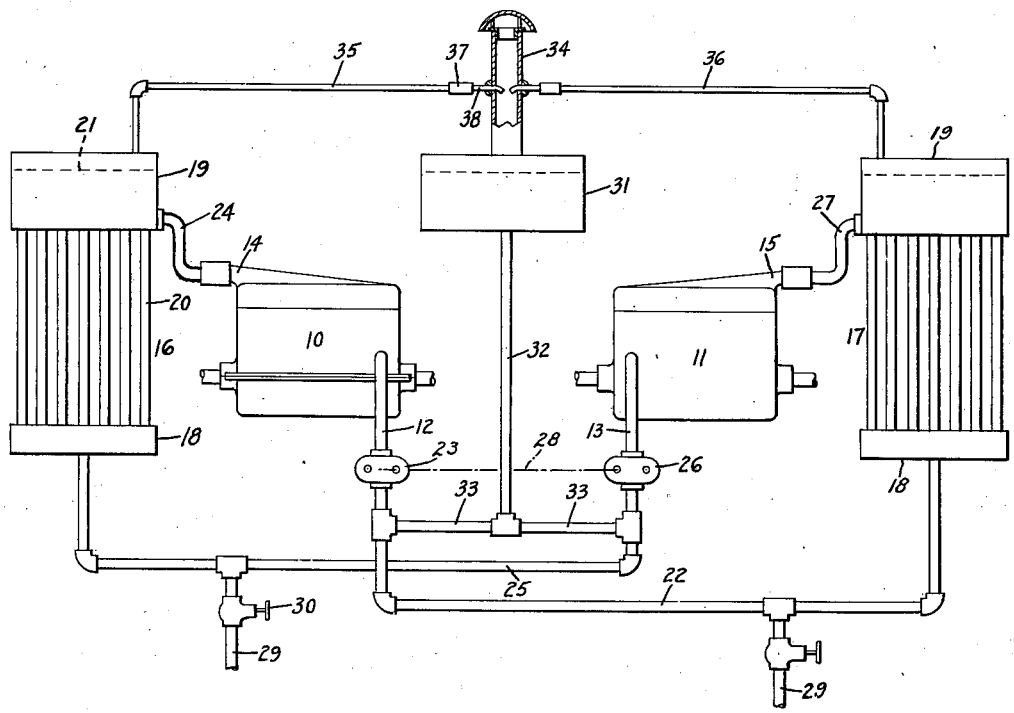
Inventor:
Frederick H. Brehob,
by Harry E. Dunham
His Attorney.

Patented June 15, 1937

2,084,187

UNITED STATES PATENT OFFICE 2,084,187

COOLING SYSTEM FOR INTERNAL COMBUSTION ENGINE ARRANGEMENTS

Frederick H. Brehob, Erie, Pa., assignor to General Electric Company, a corporation of New York Application August 23, 1935, Serial No. 37,522

5 Claims. (Cl. 123—170)

The present invention relates to cooling systems for internal combustion engine arrangements such as may be used for driving locomotives. In such arrangements, one or more internal combustion engines or banks of engine cylinders and cooling means including two pumps for each engine or pair of engines often are provided. Where the cooling means are in the form of surface type heat exchangers or radiators using air as a cooling medium, it has been found that in many cases the engines are not uniformly cooled. This may be due to differences in load output between the different engines and due also to the different cooling effect of the surface type heat exchangers because of differences in the cooling forces such as direction of wind and direction of locomotive with respect to the heat exchangers. For example, it is clear that it is oftentimes advisable and desirable to locate two or more radiators removed from each other, located so that the maximum amount of exposed surface to the atmosphere can be obtained consistent with the design of the locomotive as a whole, so that the coolers or heat exchangers receive cooling air in the most efficient manner.

The object of my invention is to provide an improved construction and arrangement of the above specified type, whereby the internal combustion engine or engines are more uniformly cooled. This is accomplished in accordance with my invention by connecting one or more engines or banks or groups of engine cylinders in series with the respective coolers, or in the event where there is one engine with two pumps, connecting the two pumps in series with the respective coolers. For instance, if an arrangement includes two engines or banks of cylinders and two coolers, I connect the engines and coolers so that each engine receives cooling medium, such as water, from one cooler and discharges the heated cooling medium into the other cooler. The circulation of cooling medium may be effected in the known manner by circulating pumps.

For a better understanding of what I believe to be novel and my invention, attention is directed to the following description and the claims appended thereto in connection with the accompanying drawing.

The single figure of the drawing shows diagrammatically an arrangement in accordance with my invention. The arrangement comprises engine means, in the present instance, two groups or banks of engine cylinders in the form of separate internal combustion engines 10 and 11 having cooling jackets with inlets 12, 13, and outlets 14, 15, respectively. The cooling jackets are formed in known manner around the cylinders to define spaces through which the cooling medium, such as water, is circulated. The cooling medium is conducted through two surface type heat exchangers or radiators 16 and 17, respectively. Each heat exchanger includes a lower header 18 and an upper header 19 connected by a plurality of cooling tubes 20. The level of the cooling liquid in the heat exchangers is indicated by dotted lines 21. The cooling of the water in the heat exchangers is effected by air passed through the intermediate spaces defined by the tubes or banks of tubes 20. The inlet 12 for the engine 10 receives water from the lower header of the heat exchanger 17 through means including a conduit 22 and a pump 23. The water discharged from the engine 10 is conducted in accordance with my invention to the upper header 19 of the other heat exchanger 16 by means of a conduit 24. Similarly, the engine 11 receives water from the lower header 18 of the heat exchanger 16 through a conduit 25 and a pump 26, and the water is discharged from the outlet 15 of the engine 11 through a conduit 27 into the upper header of the heat exchanger 17. Thus, the engines or engine means are connected in series with the pumps, each engine or bank of cylinders receiving cooling medium from one heat exchanger and discharging it to the other heat exchanger. The pumps 23 and 26 may be driven from a single shaft or separate shafts on the same engine as indicated by a dash-dotted line 28. The conduits 22 and 25 are provided with branch pipes 29 having valves 30 through which the cooling medium may be drained from the system. Cooling medium, in the present instance water, is supplied to the system from a reservoir 31 located so that water contained therein is at the same level as in the upper headers 19 of the heat exchangers. The reservoir 31 is connected by conduits 32, 33 to the inlets of the pumps 23 and 26 so that as the water from the heat exchangers is used, it is uniformly replenished from the tank 31 flowing through the intermediaries of both engines or banks of engine cylinders 10 and 11 to the heat exchangers 16 and 17. The top of the reservoir 31 is provided with a supply conduit 34 for receiving make-up liquid from an external source, not shown. This conduit is vented to atmosphere to prevent excessive internal pressures due to expansion or boiling of the cooling medium. The headers 19 of the heat exchangers 16 and 17 are vented by means of pipes 35 and 36 connected at one end to the headers and projecting into the conduit 34. Each vent pipe 35, 36 in the present instance includes a coupling 37 and an end portion 38 welded to the conduit 34. The end portion 38 projects into the conduit 34 and is bent downward so that make-up water supplied through the conduit 34 does not enter the pipes, and in the event of water discharging through the vented pipes, the water does not splash out of the top of the vented conduit 34.

The system may be used without the tank 31, provided the storage capacity is ample and suitable in headers 19, in which case conduits 34 and 32 become one and the same.

During operation, uniform cooling of the engines is assured, due to the fact that they are connected in series with the heat exchangers. This is a distinct advantage of my invention. It provides for better efficiency and more reliable operation of the system, as it eliminates the necessity of operating any cooling fans which may be used at different speeds for the two coolers 16 and 17, thereby saving power and simplifying the control.

Another important advantage of my system is apparent in the case of internal combustion engine arrangements including two separate engines of which one only is operated at certain times. Due to the fact that the two engines are connected in series with their respective heat exchangers, the engine which is not operated is maintained heated, that is, maintained at a certain temperature during operation of the other engine. This permits putting the first engine into operation quickly without the danger of setting up excessive stresses during the starting period. Cooling medium, such as water, is circulated through both engines at all times. This is of special significance where two engines and two heat exchangers are provided for operating a locomotive because during operation of one engine only such engine protects the entire locomotive drive, that is, the other engine as well as both heat exchangers, preventing freezing of the cooling medium during cold weather conditions. During hot weather conditions, when the load is light and only one engine is needed, both radiators or heat exchangers may be used for effecting cooling, thereby saving power for driving special fans to cool the heat exchangers. Valves for controlling the flow of cooling medium through the individual engine may be completely eliminated. Also, the provision of separate coolers in the form of fans to cool the engine which receives less cooling medium or to cool the heat exchanger which is less favorably located under a particular condition is no longer necessary because of the equalization of the cooling effect of both heat exchangers.

A further advantage of my invention results from the fact that the conduit for conducting make-up cooling medium, such as water, to the heat exchangers is connected to the inlet or suction side of both pumps. This arrangement provides for uniform flow of make-up cooling liquid to both engines or banks of engine cylinders and their respective heat exchangers.

Still another important advantage lies in the venting of both heat exchangers to the make-up conduit 34. In case of overflow of one heat exchanger, the liquid discharged therefrom is not lost but returned through the make-up conduit 34 to the system.

In accordance with the provisions of the patent statutes I have described the method of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. The combination of at least two banks of internal combustion engine cylinders with at least two pumps and a plurality of coolers for the banks connected in series so that each bank receives cooling medium from one cooler and discharges it into another cooler.

2. The combination of a first and a second bank of internal combustion engine cylinders, two pumps, and a first and a second cooler connected in series with the pumps and cylinders, the first bank receiving cooling medium from the first cooler and discharging it into the second cooler and the second bank receiving cooling medium from the second cooler and discharging it to the first cooler.

3. The combination of a first and a second bank of internal combustion engine cylinders, means for cooling the banks comprising a first and a second cooler, each cooler having a lower and an upper header and a plurality of cooling tubes between the headers, a first pump for circulating cooling medium from the first cooler through the first bank into the second cooler, and a second pump for circulating cooling medium from the second cooler through the second bank into the first cooler.

4. The combination of a first and a second bank of internal combustion engine cylinders, means for cooling the cylinders comprising a first and a second surface type heat exchanger, means including a pump for each bank for forcing cooling medium from the first heat exchanger through the first bank to the second heat exchanger and from the second heat exchanger through the second bank to the first heat exchanger, a reservoir for containing make-up cooling medium at a level substantially equal to the level of the cooling medium in the surface type heat exchangers, and conduit means connected between the reservoir and the inlets of the pumps for conducting make-up cooling medium from the reservoir through the banks to the heat exchangers.

5. The combination of two internal combustion engines, at least two surface type heat exchangers connected in series with the engine means, pump means for circulating cooling medium from one heat exchanger through one engine to the other heat exchanger, a conduit connected to the pump means, and means for venting one of the heat exchangers comprising a pipe connected between such heat exchanger and said conduit to conduct overflow from such heat exchanger through the engine to the other heat exchanger.

FREDERICK H. BREHOB.